United States Patent [19]
Labana et al.

[11] 4,359,554
[45] * Nov. 16, 1982

[54] POWDER PAINT WITH EPOXY AND HYDROXY COPOLYMER AND DICARBOXYLIC ACIDS

[75] Inventors: Santokh S. Labana, Dearborn Heights; Ares N. Theodore, Farmington, both of Mich.

[73] Assignee: Ford Motor Company, Dearborn, Mich.

[*] Notice: The portion of the term of this patent subsequent to Jan. 13, 1993, has been disclaimed.

[21] Appl. No.: 552,676

[22] Filed: Feb. 24, 1975

Related U.S. Application Data

[63] Continuation-in-part of Ser. No. 394,874, Sep. 6, 1973, abandoned.

[51] Int. Cl.$^3$ .............................................. C08F 8/46
[52] U.S. Cl. .................................. 525/386; 524/904; 525/208; 525/327.3
[58] Field of Search ................ 260/78.4 EP, 78.4 D, 260/830 R, 836; 525/207, 208, 329, 386; 524/904

[56] References Cited

U.S. PATENT DOCUMENTS

| | | | |
|---|---|---|---|
| 3,541,055 | 11/1970 | Malamet | 260/834 |
| 3,730,930 | 5/1973 | Labana | 260/23 EP |
| 3,752,870 | 8/1973 | Labana | 260/836 |
| 3,787,521 | 1/1974 | Labana et al. | 260/836 |
| 3,876,587 | 4/1975 | Matsui et al. | 260/78.4 EP |

Primary Examiner—Paul R. Michl
Attorney, Agent, or Firm—Roger L. May; Keith L. Zerschling

[57] ABSTRACT

Improved powder coating compositions are disclosed which comprise a particulate mixture of (1) a qualitatively difunctional copolymer of about 5 to about 20 weight percent of a glycidyl ester of a monoethylenically unsaturated acid, about 2 to about 10 weight percent of a $C_5$-$C_7$ hydroxyalkyl acrylates and $C_5$-$C_7$ hydroxyalkyl methacrylates, and about 70 to about 93 weight percent monoethylenically unsaturated monomers consisting essentially of monofunctional monomers selected from the group consisting of esters of a $C_1$-$C_8$ monohydric alcohol and acrylic acid, esters of a $C_1$-$C_8$ monohydric alcohol and methacrylic acid and $C_8$-$C_{12}$ monovinyl hydrocarbons, and (2) a crosslinking agent consisting of $C_4$-$C_{20}$ saturated, straight chain, aliphatic, dicarboxylic acid, said crosslinking agent being present in an amount sufficient to provide about 0.8 to about 1.1 carboxyl groups per functional group (epoxy and hydroxy groups) on said copolymer.

12 Claims, No Drawings

POWDER PAINT WITH EPOXY AND HYDROXY COPOLYMER AND DICARBOXYLIC ACIDS

This application is a Continuation-In-Part of application Ser. No. 394,874 filed Sept. 6, 1973, and now abandoned.

BACKGROUND OF THE INVENTION

Powder coating compositions are extremely desirable for use in painting substrates in that they are essentially free of organic solvents conventionally utilized in liquid paint systems. Thus, they give off little, if any, volatile material to the environment when heat cured.

Powder coatings comprising (1) a copolymer of a glycidyl acrylate and other monofunctional olefinically unsaturated monomers, (2) a dicarboxylic acid crosslinking agent and (3) a polymeric flow control agent was heretofore described in U.S. Pat. No. 3,752,870 to Santokh S. Labana, a coinventor herein.

Powder coating materials comprising: (1) a copolymer of a glycidyl acrylate and other monofunctional olefinically unsaturated monomers, (2) a crosslinking agent comprising a mixture of a monocarboxylic acid and a dicarboxylic acid, and (3) a polymeric flow control agent were heretofore described in our U.S. Pat. No. 3,730,930.

Powder coating materials comprising (1) a copolymer of a hydroxy acrylate and other monofunctional olefinically unsaturated monomers, (2) a crosslinking agent selected from anhydrides, dicarboxylic acids, and melamines, and (3) a polymeric flow control agent were heretofore described in copending U.S. patent application Ser. No. 407,128 filed Oct. 17, 1973, and now abandoned by Santokh S. Labana, a coinventor herein, and Yun F. Chang.

The components of the powder paint hereinafter disclosed are differently employed with additional materials in liquid coating compositions disclosed in U.S. Pat. No. 3,541,055 to Malamet et al. wherein there is employed with an aminoplast crosslinking agent a polymer adduct (semiester of an ester) formed by reacting an epoxy-functional, hydroxy-functional copolymer of ethylenically unsaturated monomers with a hydroxycarboxylic acid and reacting the resultant ester with a cyclic dicarboxylic acid anhydride. Aside from the fact that Malamet et al. involves a liquid paint as opposed to a powder paint, employs its epoxy and hydroxy functional copolymer as a reactant to form first an ester and thence a semiester prior to application to a substrate, and teaches the use of an aminoplast crosslinking agent, it will be obvious to those skilled in the art that in Malamet et al. the reaction of the epoxy-hydroxy functional copolymer with a carboxylic acid is carried out so as to produce esterification and stay in solution rather than crosslinking of the copolymer as in the aforementioned powder paints of U.S. Pat. Nos. 3,752,870 and 3,730,930, the latter being carried out after application to the substrate.

THE INVENTION

It now has been discussed that powder coating compositions having unexpected advantages relative to the powder coating compositions hereinbefore described can be obtained by making the copolymer both epoxy-functional and hydroxy-functional. This is accomplished by including about 2 to about 10 weight percent of a $C_5$–$C_7$ hydroxylalkyl acrylate and about 5 to about 20 weight percent of a glycidyl ester of a monoethylenically unsaturated carboxylic acid, e.g., glydicyl acrylate and glycidyl methacrylate, with the monofunctional, monoethylenically unsaturated monomers which make up the rest of the copolymer, the latter comprising about 70 to about 93 weight percent of the copolymer.

The dual functionality, aside from its crosslinking capabilities, provides additional polarity to the copolymer. In the mixing of the copolymer with the crosslinking agent to form a homogeneous powder mix, this additional polarity provides better compatibility between powder components and admits of a more homogeneous mixture and hence more uniform crosslinking on the substrate surface. These powders are effectively processed by spray drying. They resist phase separation. They may also be processed by melt blending and vacuum drying techniques. They are easily and effectively mixed by extrusion or mill rolling. Further, the need for an antistatic agent is eliminated when a film depth of less than 4 mils (0.004 inch) is to be applied.

Except in those instances wherein a specific compound is named, the term "acrylate" is used in this specification to include esters of both acrylic acid and methacrylic acid, i.e., acrylates and methacrylates.

DETAILED DESCRIPTION OF THE INVENTION

Epoxy and hydroxy functional copolymers suitable for use in the powder coating materials of this invention are readily formed by conventional free radical induced polymerization of suitable alpha-beta olefinically unsaturated monomers. These copolymers having both pendant epoxide groups and pendant hydroxyl groups are potentially self-crosslinking but the epoxy-hydroxy reaction is very slow and requires large amounts of catalyst to accelerate the curing reactions. Thus, in this invention, a crosslinking agent, i.e., a dicarboxylic acid, is added to the paint binder system.

The copolymers used in this invention contain between about 5 and about 20, preferably between 8 and 15, weight percent of a glycidyl ester of a monoethylenically unsaturated carboxylic acid, e.g., glycidyl acrylate and glycidyl methacrylate. These monomers provide the copolymer with its epoxy functionality. The hydroxy functionality is provided by incorporating in the unsaturated monomer polymerization mix about 2 to about 10 weight percent of a hydroxy acrylate. The hydroxy acrylate is preferably an ester of a $C_2$–$C_3$ dihydric alcohol and acrylic or methacrylic acid. Of these, 2-hydroxyethyl methacrylate and 2-hydroxypropyl methacrylate are most preferred.

The remainder of the copolymer consists essentially of monofunctional, alpha-beta olefinically unsaturated monomers. These can be acrylates or a mixture of acrylates and monovinyl hydrocarbons. Preferably, in excess of fifty (50) weight percent of the copolymer monomers are esters of a $C_1$–$C_8$ monohydric alcohol and acrylic or methacrylic acid, i.e., methyl methacrylate, ethyl acrylate, butyl acrylate, butyl methacrylate, hexylacrylate, and 2-ethyl hexyl methacrylate. $C_8$–$C_{12}$ monovinyl hydrocarbons such as styrene, alpha methyl styrene, vinyl toluene, t-butyl styrene, chlorostyrene, and alpha methyl styrene are suitable for use but preferably comprise less than fifty (50) weight percent of the copolymer. Other vinyl monomers such as vinyl chloride, acrylonitrile, methacrylonitrile, and vinyl acetate may be used as modifying monomers. When employed these comprise between 0 and 30 percent by weight of the monomer mixture.

The epoxy-functional and hydroxy-functional copolymers used in these coating compositions have a glass transition temperature in the range of 40° C. to 90° C., preferably between 50° C. and 80° C., and a molecular weight ($\overline{M}_n$) in the range of about 1500 to about 15,000, preferably about 2500 to about 6,000.

In preparing this copolymer, the epoxy-functional monomer, e.g., glycidyl methacrylate, and the hydroxy-functional monomer, e.g., 2-hydroxyethyl methacrylate, are mixed with the aforementioned ethylenically unsaturated remainder monomers and reacted by conventional free radical initiated polymerization in such proportions as to obtain the copolymer for the powder coating compositions. Thus, when the preferred ethylenically unsaturated remainder monomers are used with the epoxy-functional monomer to form the copolymer, the epoxy-functional monomer, e.g., glycidyl methacrylate, is present in the copolymer from about 5 weight percent to about 20 weight percent, the hydroxy-functional monomer, e.g., 2-hydroxypropyl methacrylate is present in the copolymer from about 2 to about 10 weight percent, and the preferred remainder monomers are present from about 93 to about 70 weight percent. Generally, a free radical initiator is needed to induce the polymerization reaction. A large number of free radical initiators are known to the art and are suitable for this purpose. These include benzoyl peroxide, lauryl peroxide, t-butylhydroxyperoxide, acetylcyclohexane sulfonyl peroxide, diisobutyryl peroxide, di-(2-ethylhexyl) peroxydicarbonate, diisopropyl peroxydicarbonate, t-butylperoxypivalate, deconoyl peroxide, azobis(2-methylpropionitrile), etc. The polymerization is preferably carried out in solution using a solvent in which the epoxy-functional, hydroxy-functional copolymer is soluble. Toluene, xylene, dioxane, butanone, etc., are suitable solvents for this polymerization. If the epoxy-functional, hydroxy-functional copolymer is prepared in solution, the solid copolymer can be precipitated by pouring the solution at a slow rate into a non-solvent for such copolymer such as hexane, octane or water under a suitable agitation condition. The copolymer thus obtained is further dried so that it contains less than three percent of the materials that volatilize at the temperatures used for baking the coatings.

These copolymers can also be prepared by emulsion polymerization, suspension polymerization, bulk polymerization or their suitable combinations. In these methods of preparing the copolymers, chain transfer agents may be required to control the molecular weight of the copolymer to a desired range. The solid copolymers obtained by these methods must also be dried to contain less than three percent of the materials that volatilize at the temperatures used for baking the coatings.

For powder coating applications, both molecular weight and molecular weight distribution of the epoxy-functional, hydroxy-functional copolymer are important. While the molecular weight ($\overline{M}_n$) range extends from about 1500 to about 15,000, the copolymer component must not contain significant amounts of higher molecular weight fractions. No more than 5 percent of the copolymer should be of molecular weight greater than 20,000. The molecular weight distribution as measured by the ratio of weight average molecular weight to number average molecular weight ($\overline{M}_w/\overline{M}_n$) should be in the range of 1.6 to 3.0. The preferred range of molecular weight distribution is in the range of 1.7 to 2.2.

These powder coating compositions include as crosslinking agents for the aforedescribed copolymers saturated, straight chain, aliphatic, dicarboxylic acid containing 4 to 20 carbon atoms per molecule in the amount of about 0.8 to about 1.1 carboxyl groups for each functional group, here meaning epoxy groups and hydroxy groups, in the copolymer. The preferred dicarboxylic acids are those containing from 5 to 13 carbon atoms per molecule. In still greater detail, the most desirable acids are adipic acid, pimelic acid, suberic acid, azelaic acid, sebacic acid, undeconoic acid and brassylic acid. The acids, of course, are used as the crosslinking agent in the forming of the final cured film.

These powder coating compositions advantageously contain a flow control agent as a part of the powder coating mixture. The flow control agent is a polymer having a molecular weight ($\overline{M}_n$) of at least 1000 and advantageously comprises between 0.05 and 4.0 weight percent of the mixture. The flow control agent has a glass transition temperature at least 20° C. below the glass transition temperature of the mixture's copolymer.

One group of suitable flow control agents are acrylic polymers. Preferred acrylic polymers which may be used for the flow control agent are polylauryl acrylate, polybutyl acrylate, poly (2-ethylhexyl acrylate), polylauryl methacrylate and polyisodecyl methacrylate.

The flow control agent may also be a fluorinated polymer having a surface tension, at the baking temperature of the powder, lower than that of the copolymer utilized in the mixture. Preferred flow control agents, if the agent is a fluorinated polymer are esters of polyethyleneglycol or polypropyleneglycol and fluorinated fatty acids. For example, an ester of polyethyleneglycol of molecular weight of over 2500 and perfluoro octanoic acid is a useful flow control agent. Polymeric siloxanes of molecular weight of over 1000, advantageously 1000 to 20,000, may also be useful as flow control agents, e.g., polydimethyl siloxane or polymethylphenyl siloxane.

A coating composition formed in accordance with the teachings of this invention may include a small weight percent of a catalyst in order to increase the crosslinking rate of the powder coating composition at the baking temperature thereof. Baking temperature will ordinarily be in the range of 130° to 200° C. and the catalyst should produce a gel time for the powder coating composition at the baking temperature to be used which is at least 1 minute but no greater than 40 minutes. This gel time is preferably in the range of 1 to 12 minutes and most preferably between about 2 and about 8 minutes at the baking temperature.

Some catalysts which are suitable for use in the powder coating compositions include tetraalkylammonium salts, imidazole type catalyst, tertiary amines and metal salts of organic carboxylic acids. The tetraalkylammonium salt catalysts include the following: tetrabutyl ammonium chloride (bromide or iodide), trimethylbenzylammonium chloride, dodecyl dimethyl (2-phenoxyethyl), ammonium bromide, diethyl (2-hydroxy ethyl) methyl ammonium bromide. Suitable catalysts of the imidazole type include: 2-methyl-4-ethyl imidazole, 2-methyl imidazole, imidazole, 2-[(N-benzylanilino) methyl]-2-imidazoline phosphate, and 2-benzyl-2-imidazoline hydrochloride. Suitable tertiary amine catalysts for the powder coating compositions of this invention include: triethylenediamine, N,N-diethylcyclohexylamine, and N-methyl morpholine. The metal salts of organic carboxylic acid which are catalysts for the powder coatings of this invention include, but are not limited to: stannous octoate, zinc naphthenate, cobalt naphthenate, zinc octoate, stannous 2-ethylhexoate, phenylmercuric propionate, lead neodecanoate, dilbutyl tin dilaurate and lithium benzoate.

The catalyst used in an individual powder coating composition is generally solid at room temperature and has a melting point of from 50° C. to 200° C.

Conventional non-metallic and metallic pigments can be used with these powder coating compositions. Such are conventionally employed in an amount such as to constitute between about 6 and about 35 weight percent of the total mixture depending on the pigment selected and the gloss required for the baked coating.

Since individual powder coating compositions of this invention can be applied to an article to be painted by electrostatic methods, one may desire to include a small weight percentage of an antistatic agent in such compositions. In particular, the antistatic agent is included in a range from 0.05 weight percent of the total powder composition. Suitable antistatic agents include, but are not limited to, tetraalkylammonium salts as discussed previously and which also serve as catalysts. Other suitable antistatic agents include: alkyl-poly (ethyleneoxy) phosphate or alkylauryl poly (ethyleneoxy) phosphates as, for example, ethyl benzyl poly (ethyleneoxy) phosphate; polyethyleneimine, poly (2-vinyl pyrrollidone), pyridinium chloride, poly (vinyl pyridium chloride), polyvinyl alcohol or inorganic salts.

A plasticizer may be used in a powder coating composition of this invention if desired. The type of plasticizers used very often include adipates, phosphates, phthalates, sebacates, polyesters derived from adipic acid or azelaic acid, and epoxy or epoxidized plasticizers. Some of these plasticizers are: dihexyl adipate, diisooctyl adipate, dicyclohexyl adipate, triphenylphosphate, tricresylphosphate, tributylphosphate, dibutylphthalate, dioctylphthalate, butyl octyl phthalate, dioctyl sebacate, butyl benzyl sebacate, dibenzyl sebacate, butanediol-1,4-diglycidyl ether and cellulose acetate butyrate.

Having described the various materials which are employed in formulating the powder coating compositions of this invention, a plurality of examples are hereinafter set forth to illustrate various individual powder coating compositions.

Illustrated copolymers vary in molecular weight within the molecular weight range of about 1500 to about 15,000 and the concentration of carboxyl groups of the crosslinking agent per functional group, here meaning epoxy groups and hydroxy groups, in the copolymer is in the range of about 0.8 to about 1.1.

EXAMPLE 1

An epoxy-functional, hydroxy-functional copolymer is prepared from the below listed components in the manner hereinafter described:

| Reactants | Amounts, grams | Percent by Weight Of Total Reactants |
|---|---|---|
| glycidyl methacrylate | 30.0 | 15 |
| hydroxyethyl methacrylate | 10.0 | 5 |
| butyl methacrylate | 80.0 | 40 |

-continued

| Reactants | Amounts, grams | Percent by Weight Of Total Reactants |
|---|---|---|
| methyl methacrylate | 80.0 | 40 |

The above-mentioned monomers are admixed in the proportions above set forth and 11.0 grams of 2,2'-azobis-(2-methylpropionitrile), hereinafter called AIBN, are added to the mixture. The mixture is slowly added to 200 ml of toluene heated to 80° to 90° C. which is being stirred vigorously under a nitrogen atmosphere. A condenser is provided at the top of the toluene heated to 80°–90° C. which is being stirred vigorously under a nitrogen atmosphere. A condenser is provided at the top of the toluene container to condense the toluene vapors and return the condensed toluene to the container. The monomer mixture is added through a regulating valve and the rate of addition is controlled to maintain a reaction temperature of 90°–110° C. with the rest of the heat supplied from an external heater. After the addition of the monomer mixture is completed (3) hours, 0.8 grams of AIBN dissolved in 10 ml acetone is added over a one half ($\frac{1}{2}$) hour period and refluxing is continued for two (2) additional hours.

The resultant toluene-polymer solution is diluted with 200 mls. acetone and coagulated in 2 liters of hexane. The white powder is dried in the vacuum oven at 55° C. for 24 hours. Its molecular weight is determined to be $(\overline{M}_w/\overline{M}_n) = 6700/3200$ and WPE (molecular weight per epoxide group) is about 1000.

Forty-seven grams of the prepolymer are ball-milled with 3 grams of a commercially available epichlorohydrin-bisphenol A type diepoxide (melting range—64–76° C., viscosity in poise—0.8–1.7 as a 40% solution in butylcarbitol, average molecular weight—900 and an average WPE of 450–525), 5.3 grams of azelaic acid, 4.5 grams of titanium dioxide, 4.0 grams of Ferrite yellow (pigment) and 0.4 grams of poly (2-ethylhexyl acrylate) for 3–5 hours. The molecular weight of the poly (2-ethylhexyl acrylate) is determined to be $(\overline{M}_n) = 9000$. The fine powder mixture is roll-milled for 10 minutes at 110° C. The resulting melt is granulated and pulverized to particles of 15–50 microns.

The resulting powder obtained in this fashion is a powder coating composition of the invention. The powder is sprayed electrostatically on a grounded steel panel by using an electrostatic powder spray gun operating at 60 KV charging voltage. After deposition of powder, the panel is heated to 175° C. and maintained at that temperature for twenty (20) minutes.

The glossy coating obtained on the panel has good adhesion to the steel panel and good impact strength. This coating when applied to other substrates such as glass, brass, zinc, aluminum, copper and bronze also exhibits good adhesion. The coatings obtained are not soluble in gasoline, xylene, acetone, methyl ethyl ketone or toluene.

EXAMPLE 2

An epoxy-functional, hydroxy-functional copolymer is prepared from the below listed components in the manner hereinafter described:

| Reactants | Percent by Weight Of Total Reactants |
|---|---|
| glycidyl methacrylate | 10 |

| Reactants | Percent by Weight Of Total Reactants |
|---|---|
| hydroxyethyl methacrylate | 5 |
| butyl methacrylate | 45 |
| methyl methacrylate | 40 |

These monomers are admixed. AIBN in the amount of 6 percent of the total mixture is dissolved in 5.0 ml acetone and added to the monomer mixture. These monomers are reacted using the procedures of Example 1 and an epoxy-functional, hydroxy-functional copolymer is formed. This copolymer has a glass transition temperature, hereinafter referred to as Tg. of 53° C. and molecular weight of $(\overline{M}_w/\overline{M}_n)=5145/2950$.

One hundred grams of the 47 percent toluene solution of this prepolymer is dispersed with 4.0 grams of azelaic acid, 3.0 grams of the diepoxide used in Example 1, 5.0 grams titanium dioxide, 4.0 grams Ferrite yellow and 0.41 grams of poly (2-ethylhexyl acrylate) of $\overline{M}_n=9000$. The dispersion is accomplished by ball-milling the mixture overnight in a pebble mill. The resulting homogeneous mixture is reduced to 40% total solids with toluene and spray dried at 140° F.

A homogeneous powder is produced which contains less than 1.3% solvent and is in a form suitable for spraying on substrates mentioned in Example 1.

After the powder is deposited on steel panels electrostatically as in Example 1, it is cured at 170° C. for 25 minutes. The resulting glossy coating has good adhesion and impact strength. It is not soluble in xylene, toluene, gasoline, methanol and methyl ethyl ketone.

EXAMPLE 3

An epoxy-functional, hydroxy-functional copolymer is prepared from the following components in the manner hereinafter set forth.

| Reactants | Grams | Percent by Weight Of Total Reactants |
|---|---|---|
| glycidyl methacrylate | 30.0 | 15 |
| hydroxyethyl methacrylate | 6.0 | 3 |
| butyl methacrylate | 84.0 | 42 |
| methyl methacrylate | 80.0 | 40 |

AIBN in the amount of 11.0 grams (5.5%) are dissolved in 25 ml acetone and added to the monomer mixture. The monomers are reacted as in Example 1 to produce an epoxy-functional, hydroxy-functional copolymer having molecular weight of $(\overline{M}_w/\overline{M}_n)=6870/3600$ and a Tg. of 54° C.

This copolymer is isolated as in Example 1 and compounded with the same amounts of the same materials as in Example 1 except that 5.5 grams of azelaic acid are used. Compounding is effected with a Brabender Plasticorder extruder 25 110° C. These coatings exhibit good adhesion and impact strength. These coatings exhibit high solvent resistance to toluene, xylene or methyl ethyl ketone for 1 minute.

EXAMPLE 4

An epoxy-functional, hydroxy-functional copolymer is prepared from the following components in the manner hereinafter set forth:

| Reactants | Grams | Percent by Weight Of Total Reactants |
|---|---|---|
| glycidyl methacrylate | 20.0 | 10 |
| hydroxyethyl methacrylate | 20.0 | 10 |
| butyl methacrylate | 80.0 | 40 |
| methyl methacrylate | 80.0 | 40 |

The above-listed monomers are admixed and to this mixture is added 12 grams of AIBN (6%) dissolved in 20 ml of acetone. The monomers are reacted following the procedure of Example 1 and an epoxy-functional, hydroxy-functional copolymer is produced having a molecular weight of $(\overline{M}_w/\overline{M}_n)=5670/2970$ and a Tg. of 56° C.

Isolation and compounding of this prepolymer is carried out following the procedure of Example 1 using the same ingredients, exclusive of the copolymer and azelaic acid, in the same proportions as in Example 1.

EXAMPLE 5

The procedures of Examples 1-4 are repeated with the single difference that an equimolar amount of glycidyl acrylate is substituted for the glydicyl methacrylate in the copolymer.

EXAMPLE 6

The procedures of Example 1 are repeated except for the differences that (1) the copolymer is formed from glycidyl methacrylate 20% by weight, hydroxyethyl methacrylate 2% by weight, isobutyl acrylate 25% by weight, alpha methyl styrene 15% by weight, methacrylonitrile 15% by weight and methyl methacrylate 23% by weight, and (2) 7.9 grams of azelaic acid are used.

EXAMPLE 7

The procedures of Example 1 are repeated except for the differences that (1) the copolymer is formed from glycidyl methacrylate 5% by weight, hydroxyethyl methacrylate 10% by weight, acrylonitrile 10% by weight, butyl acrylate 30% by weight and methyl methacrylate 45% by weight.

EXAMPLE 8

The procedures of Examples 1-7 are repeated with the single difference that a functionally equivalent amount of adipic acid is substituted for the azelaic acid crosslinking agent.

EXAMPLE 9

The procedures of Examples 1-7 are repeated with the single difference that a functionally equivalent amount of pimelic acid is substituted for the azelaic acid crosslinking agent.

EXAMPLE 10

The procedures of Examples 1-7 are repeated with the single difference that a functionally equivalent amount of suberic acid is substituted for the azelaic acid crosslinking agent.

EXAMPLE 11

The procedures of Examples 1-7 are repeated with the single difference that a functionally equivalent amount of sebacic acid is substituted for the azelaic acid crosslinking agent.

EXAMPLE 12

The procedures of Examples 1-7 are repeated with the single difference that a functionally equivalent amount of undecanoic acid is substituted for the azelaic acid crosslinking agent.

EXAMPLE 13

The procedures of Examples 1-7 are repeated with the single difference that a functionally equivalent amount of brassylic acid is substituted for the azelaic acid crosslinking agent.

EXAMPLE 14

The procedures of Examples 1-7 are repeated with the single difference that in the forming of the copolymer a functional equivalent amount of hydroxyethyl acrylate is substituted for the hydroxyethyl methacrylate.

EXAMPLE 15

The procedures of Examples 1-7 are repeated with the single difference that in the forming of the copolymer a functionally equivalent amount of hydroxypropyl acrylate is substituted for the hydroxyethyl methacrylate.

EXAMPLE 16

The procedures of Examples 1-7 are repeated with the single difference that in the forming of the copolymer a functionally equivalent amount of hydroxypropyl methacrylate is substituted for the hydroxyethyl methacrylate.

EXAMPLE 17

The procedures of Examples 1-7 are repeated with the single difference that in the compounding of the powder coating material an equivalent amount of poly (lauryl acrylate)—($M_n$=8000) is substituted for the poly (2-ethylhexyl acrylate) flow control agent.

EXAMPLE 18

The procedures of Examples 1-7 are repeated with the single difference that in the compounding of the powder coating material in equivalent amount of poly (2-ethylhexyl acrylate)—$M_n$=11,000 is substituted for the poly (2-ethylhexyl acrylate) flow control agent ($M_n$=9000).

EXAMPLE 19

The procedures of Examples 1-7 are repeated with the single difference that in the compounding of the powder coating material an equivalent amount of poly (butyl acrylate)—$M_n$=9000 is substituted for the poly (2-ethylhexyl acrylate) flow control agent.

EXAMPLE 20

The procedures of Examples 1-7 are repeated with the single difference that in the compounding of the powder coating material an equivalent amount of poly (isodecyl methacrylate)—$M_n$=5000 is substituted for the poly (2-ethyl acrylate) flow control agent.

EXAMPLE 21

The procedures of Examples 1-7 are repeated with the single difference that in the compounding of the coating material an equivalent amount of polyethylene glycol perfluoro octoate—$M_n$=3400 is substituted for the poly (2-ethylhexyl acrylate) flow control agent.

EXAMPLE 22

The procedures of Examples 1-7 are repeated with the single difference that in the compounding of the coating material an equivalent amount of poly (methyl siloxane) is substituted for the poly (2-ethylhexyl acrylate) flow control agent.

EXAMPLE 23

The procedures of Examples 1-7 are repeated with the single difference that the flow control agent, poly (2-ethylhexyl acrylate), is reduced from 0.42 grams to 0.25 grams.

EXAMPLE 24

The procedures of Examples 1-7 are repeated with the single difference that the flow control agent, poly (2-ethylhexyl acrylate), is increased from 0.42 grams to 2.0 grams.

EXAMPLE 25

The procedures of Examples 1-7 are repeated with the single difference that the flow control agent, poly (2-ethylhexyl acrylate), is increased from 0.42 grams to 4.0 grams.

EXAMPLE 26

The procedures of Examples 1-7 are repeated with the single difference that the copolymer is formed from the following monomers:

| Reactants | Percent by Weight Of Total Reactants |
|---|---|
| glycidyl methacrylate | 15 |
| hydroxyethyl methacrylate | 6 |
| vinyl chloride | 22 |
| butyl methacrylate | 17 |
| methyl methacrylate | 40 |

EXAMPLE 27

The procedure of Example 1 is repeated except for the differences that (1) the copolymer is formed from glycidyl methacrylate 20% by weight, hydroxyethyl methacrylate 2% by weight, butyl acrylate 20% by weight, and methyl methacrylate 58% by weight, (2) 7% by weight of the reaction initiator is employed in reacting the monomer mixture to form the copolymer, and (3) 8.0 parts by weight of azelaic acid are compounded with 47.0 parts by weight of the copolymer and the other components of the coating material in Example 1, the latter being employed in the same amounts as in Example 1. The molecular weight of the copolymer ($\overline{M}_n$) is about 1500.

EXAMPLE 28

The procedure of Example 1 is repeated except for the differences that (1) the copolymer is formed from glycidyl methacrylate 8% by weight: hydroxy ethyl methacrylate 5% by weight, butyl acrylate 22% by weight, methyl methacrylate 60% by weight and styrene 6% by weight (2) 0.8% by weight of the reaction initiator is employed in reacting the monomer mixture to form the polymer, and (3) 3.2 grams of azelaic acid are compounded with 50 grams of the copolymer and the other components of the coating material in Example 1, the latter being employed in the same amount, as in Example 1. Deposition and curing of the coatings is carried out following the procedure of Example 1. The molecular weight of this copolymer ($\overline{M}_n$) is about 15,000.

The coatings heretofore exemplified when sprayed on a variety of wood, metal and glass substrates and heat cured thereon provide coatings which demonstrate good adhesion to the substrate and good organic solvent resistance.

Many modifications of this invention will be apparent to those skilled in the art in view of this specification. It is intended that all such modifications which fall within the scope of this invention be included within the appended claims.

We claim:

1. In a thermosetting powder paint which exclusive of pigments, catalysts, antistatic agents, plasticizers, and flow control agents, the same being conventional nonreactive additives to a thermoset powder paint, consists essentially of a coreactable particulate mixture of
   (A) a copolymer consisting essentially of about 5 to about 20 weight percent of a glycidyl ester of an unsaturated acid and about 80 to about 95 weight percent of other monoethylenically unsaturated monomers, and having a glass transition temperature in the range of about 40° C. to about 90° C. and a molecular weight ($\overline{M}_n$) in the range of about 1500 to about 15,000 and
   (B) a $C_4$-$C_{20}$ saturated, straight chain, aliphatic, dicarboxylic acid in the amount of about 0.8 to about 1.1 carboxyl groups for each functional group on said copolymer,
the improvement wherein said copolymer is qualitatively difunctional and said other monoethylenically unsaturated monomers consist essentially of difunctional monomers selected from the group consisting of $C_5$-$C_7$ hydroxyalkyl acrylates and $C_5$-$C_7$ hydroxyalkyl methacrylates in an amount comprising about 2 to about 10 weight percent of said copolymer and monoethylenically unsaturated monomers consisting essentially of monofunctional monomers selected from the group consisting of esters of a $C_1$-$C_8$ monohydric alcohol and acrylic acid, esters of a $C_1$-$C_8$ monohydric alcohol and methacrylic acid and $C_8$-$C_{12}$ monovinyl hydrocarbons.

2. A powder paint in accordance with claim 1 wherein above 50 weight percent of said monofunctional monomers are acrylates and methacrylates.

3. A powder paint in accordance with claim 1 wherein said copolymer has molecular weight ($M_n$) in the range of about 2500 to about 6000.

4. A powder paint in accordance with claim 1 wherein said glycidyl ester of a monoethylenically unsaturated acid is selected from glycidyl acrylate and glycidyl methacrylate.

5. A thermosettable powder paint which comprises a coreactive mixture of:
   1. A qualitatively difunctional copolymer having a glass transition temperature in the range of about 40° C. to about 90° C. and a molecular weight ($M_n$) in the range of about 1,500 to about 15,000, said copolymer being formed from a monomer mixture consisting essentially of
      (a) between about 5 and about 20 weight percent of a glycidyl ester of a monoethylenically unsaturated carboxylic acid;
      (b) between about 2 and about 10 weight percent of difunctional monomers selected from the group consisting of $C_5$-$C_7$ hydroxyalkyl acrylates and $C_5$-$C_7$ hydroxyalkyl methacrylates;
      (c) between about 70 and about 93 weight percent of monoethylenically unsaturated monomers consisting essentially of monofunctional monomers selected from the group consisting of esters of a $C_1$-$C_8$ monohydric alcohol and acrylic acid, esters of a $C_1$-$C_8$ monohydric alcohol and methacrylic acid and $C_8$-$C_{12}$ monovinyl hydrocarbons; and
      (d) up to 30 weight percent of modifying monomers selected from the group consisting of vinyl chloride, acrylonitrile, methacrylonitrile and vinyl acetate; and
   2. $C_4$-$C_{20}$ saturated, straight chain, aliphatic dicarboxylic acid in an amount of about 0.8 to about 1.1 carboxyl groups for each functional group on said copolymer.

6. A powder paint in accordance with claim 5 wherein said copolymer has a glass transition temperature in the range of about 50° C. to about 80° C. and a molecular weight ($M_n$) in the range of about 2,500 to about 6,000.

7. A powder paint in accordance with claim 5 wherein said glycidyl ester is selected from glycidyl methacrylate and glycidyl acrylate and is included in said monomer mixture in an amount of between about 8 and about 15 weight percent.

8. A powder paint in accordance with claim 5 wherein said esters of a $C_1$-$C_8$ monohydric alcohol and acrylic acid and said esters of a $C_1$-$C_8$ monohydric alcohol and methacrylic acid comprise at least 50 weight percent of said monofunctional, monoethylenically unsaturated monomers of said monomer mixture.

9. A powder paint in accordance with claim 5 wherein said saturated, straight chain, aliphatic dicarboxylic acid contains 5 to 13 carbon atoms.

10. A powder paint in accordance with claim 9 wherein said saturated, straight chain, aliphatic dicarboxylic acid is selected from the group consisting of adipic acid, pimelic acid, suberic acid, azelaic acid, sebasic acid, undecanoic acid and brassylic acid.

11. A thermosettable powder paint which exclusive of pigments, catalysts, antistatic agents, plastizers, flow control agents and other nonreactive additives, consists essentially of a coreactable particulate mixture of:
   1. A qualitatively difunctional copolymer having a glass transition temperature in the range of about 50° C. to about 80° C. and a molecular weight ($M_n$) in the range of about 2,500 to about 6,000, said copolymer being formed from a monomer mixture consisting essentially of
      (a) between about 8 and about 15 weight percent of a glycidyl ester of a monoethylenically unsaturated carboxylic acid;
      (b) between about 2 and about 10 weight percent of difunctional monomers selected from the group consisting of $C_5$-$C_7$ hydroxyalkyl acrylates and $C_5$-$C_7$ hydroxyalkyl methacrylates; and
      (c) between about 75 and about 90 weight percent of monoethylenically unsaturated monomers consisting essentially of monofunctional monomers selected from the group consisting of (i) esters of a $C_1$-$C_8$ monohydric alcohol and acrylic acid (ii) esters of a $C_1$-$C_8$ monohydric alcohol and methacrylic acid, and (iii) $C_8$–$C_{12}$ monovinyl hydrocarbons, the total of said monofunctional monomers (i) and (ii) comprising at least 50 weight percent of the monofunctional monoethylenically unsaturated monomers of said monomer mixture; and 2. $C_5$–$C_{13}$ saturated, straight chain, aliphatic dicarboxylic acids in an amount of about 0.8 to about 1.1 carboxylic groups for each functional group on said copolymer.

12. A powder paint in accordance with claim 11 wherein said glycidyl ester is selected from glycidyl methacrylate and glycidyl acrylate and said saturated, straight chain, aliphatic, dicarboxylic acid is selected from the group consisting of adipic acid, pimelic acid, suberic acid, azelaic acid, sebasic acid, undecanoic acid and brassylic acid.

* * * * *